3,228,960
7-OXABICYCLO-(2.2.1) HEPTANE - 2,3 - DICARBOXIMIDO AND 7-OXABICYCLO (2.2.1) HEPT-5-ENE-2,3-DICARBOXIMIDO PHOSPHATES

Raymond H. Rigterink, Midland, Mich., assignor to The Dow Chemical Company, Midland, Mich., a corporation of Delaware
No Drawing. Filed June 20, 1962, Ser. No. 203,717
5 Claims. (Cl. 260—326)

The present invention is directed to dicarboximido phosphates corresponding to the formula

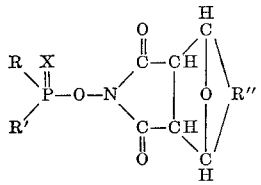

In this and succeeding formulae in the present specification and claims, X represents oxygen or sulfur, R represents loweralkoxy, R' represents amino, loweralkoxy, or loweralkylamino, and R" represents ethylene or vinylene. In the present specification and claims, the expressions loweralkyl and loweralkoxy are employed to refer, respectively, to alkyl and alkoxy radicals being of from 1 to 5 carbon atoms, inclusive.

These compounds are liquid or crystalline solid materials which are somewhat soluble in many common organic solvents and of very low solubility in water. The compounds are useful as parasiticides and are adapted to be employed as active toxicants in compositions for the control of mite, helminth, insect, bacterial and fungal organisms, for example aphids, beetles, ticks, worms, and ascarids.

The novel compounds of the present invention are prepared by several methods. In a preferred method, the compounds are prepared by reacting a phosphorochloridate or phosphorochloridothioate having the formula

with an alkali metal salt of a hydroxyimide compound having the following formula

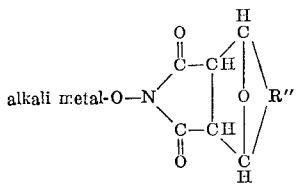

The reaction conveniently is carried out in an inert organic liquid such as acetone, dimethylformamide, carbon tetrachloride, chloroform, benzene, toluene, isobutyl methyl ketone, or methylene dichloride. The amounts of the reagents to be employed are not critical, some of the desired product being obtained when employing any proportion of the reactants. In the preferred method of operation, good results are obtained when employing substantially equimolecular proportions of the hydroxyimide alkali metal salt and phosphorochloridate or phosphorochloridothioate. The reaction takes place smoothly at the temperature range of from 0° to 100° C. with the production of the desired product and alkali metal chloride by-product.

In carrying out the reaction, the reactants are mixed and contacted together in any convenient fashion, and the resulting mixture maintained for a period of time in the reaction temperature range to complete the reaction. Following the completion of the reaction, the reaction mixture is washed with water and any organic reaction medium removed by fractional distillation under reduced pressure to obtain the desired product as a residue. This product can be further purified by conventional procedures such as washing with water and dilute aqueous alkali metal hydroxide, solvent extraction and recrystallization.

In an alternative procedure, the compounds of the present invention can be prepared by reacting phosphorus oxychloride or phosphorus thiochloride with a hydroxyimide alkali metal salt as previously defined to form an intermediate O-dicarboximido phosphorodichloridate or phosphorodichloridothioate. Good results are obtained when employing substantially equimolecular proportions of the reactants. The reaction takes place readily at temperatures of from —50° to 80° C. with the production of the desired product and halide of reaction. The intermediate is thereafter reacted with suitable molar amounts of an alkali metal alcoholate or an amino compound such as ammonia or a loweralkylamine, or successively with two of these reagents to produce the desired compound either as a diester or triester product. The reaction takes place at temperatures at which chloride of reaction is formed. When employing an alkali metal alcoholate, this chloride appears in the reaction mixture as alkali metal chloride. When employing an amino compound, chloride appears as a hydrochloride thereof: by the employment of amino compound in twice the molar amount needed to prepare the product, half of it can act as hydrogen chloride acceptor. Good results are obtained when operating at temperatures of from —10° to 60° C. and employing substantially stoichiometric amounts of the reactants. Upon completion of the reaction, the desired product is separated by procedures which in view of the present specification and claims will be evident to skilled chemists.

*Example 1.—O,O-diethyl O-7-oxabicyclo(2.2.1)hept-5-ene-2,3-dicarboximido phosphorothioate*

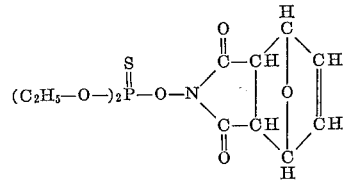

N-hydroxy - 7 - oxabicyclo(2.2.1)hept-5-ene-2,3-dicarboximide (18.6 grams; 0.1 mole), anhydrous sodium carbonate (10.6 grams; 0.1 mole), and 200 milliliters of dimethylformamide are stirred together at room temperature for 0.5 hour to produce the sodium salt of the N-hydroxy-7-oxabicyclo(2.2.1)hept-5-ene-2,3 - dicarboximide. O,O-diethyl phosphorochloridothioate (18.9 grams; 0.1 mole) is added rapidly to the above prepared salt mixture with stirring. The reaction mixture is thereafter heated to a temperature of from 60° to 65° C. with stirring, for 1 hour to complete the reaction. The reaction mixture is then cooled to about 25° C., the cooled mixture diluted with 200 milliliters of benzene, and the diluted mixture washed with 500 milliliters of water. The washed reaction mixture is dried over anhydrous calcium sulfate (Drierite), and the solvent removed from the dried product by fractional distillation under subatmospheric pressure. As a result of these operations there is obtained a crystalline O,O-diethyl O-7-oxabicyclo(2.2.1)hept-5-ene-2,3-dicarboximido phosphorothioate product melting at from 80.5° to 82° C.

*Example 2.—O-ethyl O-7-oxabicyclo(2.2.1)heptane-2,3-dicarboximido ethylphosphoramidothioate*

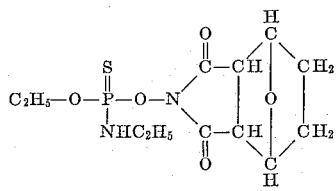

N-hydroxy - 7 - oxabicyclo(2.2.1)heptane-2,3-dicarboximide (18.3 grams; 0.1 mole), sodium carbonate (10.6 grams; 0.1 mole), and 150 milliliters of dimethylformamide, are stirred together at room temperature for 0.5 hour to produce the sodium salt of N-hydroxy-7-oxabicyclo(2.2.1)heptane - 2,3 - dicarboximide. O-ethyl ethylphosphoramidochloridothioate (18.8 grams; 0.1 mole) is added rapidly to the salt mixture with stirring. During the addition, the temperature of the reaction mixture rises moderately. The reaction mixture is heated at a temperature of from 60 to 65° C. with stirring for one hour to complete the reaction.

Subsequently the reaction mixture is permitted to cool to room temperature, the cooled mixture diluted with 150 milliliters of benzene and the diluted mixture washed with 250 milliliters of water. The solvent is removed from the washed product by fractional distillation under subatmospheric pressure to obtain the O-ethyl O-7-oxabicyclo (2.2.1)heptane - 2,3 - dicarboximido ethylphosphoramidothioate product as a liquid residue. This product is recrystallized from petroleum ether (a fraction boiling at from 86° to 100° C.) and found to be a crystalline material melting at from 84° to 86° C.

In a similar manner, the following products of the present invention are prepared.

Dipentyl 7-oxabicyclo(2.2.1)hept-5-ene-2,3-dicarboximido phosphate (molecular weight of 401.4) by reacting together the sodium salt of N-hydroxy-7-oxabicyclo(2.2.1)hept-5-ene - 2,3 - dicarboximide and dipentyl phosphorochloridate.

O-methyl O - 7 - oxabicyclo(2.2.1)hept-5-ene-2,3-dicarboximido isopropylphosphoramidothioate (melting at from 115° to 117° C. and having a sulfur content of 9.55 percent as compared with a theoretical sulfur content of 9.64 percent) by reacting together the sodium salt of N-hydroxy-7-oxabicyclo(2.2.1)hept - 5 - ene-2,3-dicarboximide and O-methyl isopropylphosphoramidochloridothioate.

Ethyl 7-oxabicyclo(2.2.1)hept-5-ene-2,3-dicarboximido N-sec-butyl-N-methylphosphoramidate (molecular weight of 356.4) by reacting together the sodium salt of N-hydroxy-7-oxabicyclo(2.2.1)hept - 5 - ene-2,3-dicarboximide and ethyl N-sec-butyl-N-methylphosphorochloridate.

O-butyl O-7-oxabicyclo(2.2.1)heptane-2,3-dicarboximido diethylphosphoramidothioate (molecular weight of 390.4) by reacting together the sodium salt of N-hydroxy-7 - oxabicyclo(2.2.1)heptane - 2,3 - dicarboximide and O-butyl diethylphosphoramidochloridothioate.

Propyl 7 - oxabicyclo(2.2.1)hept-5-ene-2,3-dicarboximido phosphoramidate (molecular weight of 302.2) by reacting together the sodium salt of N-hydroxy-7-oxabicyclo(2.2.1)hept-5-ene-2,3-dicarboximide and propyl phosphoramidochloridate.

O-methyl O - 7 - oxabicyclo(2.2.1)hept-5-ene-2,3-dicarboximido isopropylphosphoramidothioate (melting at 115°–117° C.) by reacting together the sodium salt of N-hydroxy-7-oxabicyclo(2.2.1)hept - 5 - ene-2,3-dicarboximide and O-methyl isopropylphosphoramidochloridothioate.

Methyl 7 - oxabicyclo(2.2.1)heptane-2,3-dicarboximido dipentylphosphoramidate (molecular weight of 416.5) by reacting together the sodium salt of N-hydroxy-7-oxabicyclo(2.2.1)heptane-2,3-dicarboximide and methyl dipentylphosphoramidochloridate.

O-isopropyl O-methyl O-7-oxabicyclo(2.2.1)heptane-2,3-dicarboximido phosphorothioate (molecular weight of 333.4) by reacting together the sodium salt of N-hydroxy-7-oxabicyclo(2.2.1)heptane-2,3-dicarboximide and O-isopropyl O-methyl phosphorochloridothioate.

The diester phosphorochloridates and diester phosphorochloridothioates employed as starting materials as described herein, are prepared in known procedures by reacting phosphorus oxychloride or phosphorus thiochloride with an alkali metal alcoholate to introduce two alkoxy groups in the molecule. Where it is desired to produce the mixed diester, the monoester phosphoramidochloridates or the monoester phosphoramidochloridothioates, the phosphorus oxychloride or phosphorus thiochloride is successively reacted with different alcoholates or with an alcoholate and an amino compound. Good results are obtained when employing stoichiometric amounts of the reagents and operating at temperatures at which chloride of reaction is formed. Following the reaction, the desired products are separated by known procedures.

The hydroxyimide compounds to be employed as starting materials according to the present invention are prepared by reacting hydroxylamine with a suitable dicarboxylic acid anhydride. In representative operations, N-hydroxy - 7 - oxabicyclo(2.2.1)hept - 5-ene-2,3-dicarboximide (as a crystalline product melting at 167–170° C.) is prepared by reacting hydroxylamine and 7-oxabicyclo-(2.2.1)hept-5-ene-2,3-dicarboxylic anhydride in methanol solution at room temperature. The product is purified according to conventional procedures. In a similar manner, hydroxylamine is reacted with 7-oxa-bicyclo(2.2.1)-heptane-2,3-dicarboxylic anhydride to prepare a crystalline N-hydroxy-7-oxabicyclo(2.2.1)heptane-2,3-dicarboximide product.

The new compounds of the present invention are useful as herbicides and parasiticides for the control of a number of plant, mite, insect, and bacterial and fungal organisms. For such use, the products can be dispersed on a finely divided solid and employed as dusts. Also, such mixtures can be dispersed in water with the aid of a wetting agent and the resulting aqueous suspensions employed as sprays. In other procedures, the products can be employed as constituents of organic liquid compositions, oil-in-water or water-in-oil emulsions, or water dispersions with or without the addition of wetting, dispersing, or emulsifying agents. In a representative operation, a thorough wetting application of an aqueous composition containing 50 parts by weight of O,O-diethyl O-7-oxabicyclo(2.2.1)heptane-2,3-dicarboximido phosphorothioate (prepared according to the procedures of Example 1 and melting at from 86° to 87° C.) per million parts of the composition to populations of Mexican bean beetle and Two spotted spider mite results in 100 percent kill of the beetles and mites.

I claim:

1. A compound of the formula

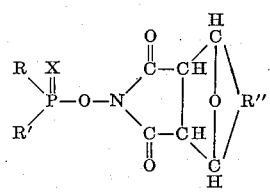

wherein R represents loweralkoxy, R' represents a member selected from the group consisting of amino, loweralkoxy and loweralkylamino, X represents a member selected from the group consisting of oxygen and sulfur, and R" represents a member selected from the group consisting of ethylene and vinylene.

2. O,O - diethyl O-7-oxabicyclo(2.2.1)hept-5-ene-2,3-dicarboximido phosphorothioate.

3. O,O - diethyl O-7-oxabicyclo(2.2.1)heptane-2,3-dicarboximido phosphorothioate.

4. O-methyl O-7-oxabicyclo(2.2.1)hept-5-ene-2,3-dicarboximido isopropylphosphoramidothioate.

5. O-ethyl O-7-oxabicyclo(2.2.1)heptane-2,3-dicarboximido ethylphosphoramidothioate.

References Cited by the Examiner

UNITED STATES PATENTS

| | | | |
|---|---|---|---|
| 2,524,145 | 10/1950 | Tawney | 260—326 |
| 2,957,906 | 10/1960 | Erickson et al. | 260—468 |
| 3,010,969 | 11/1961 | Rigterink | 167—33 |
| 3,019,250 | 1/1962 | Kayser et al. | 260—326 |
| 3,030,265 | 4/1962 | Baker et al. | 260—326 |
| 3,064,009 | 11/1962 | Rigterink | 167—33 |

FOREIGN PATENTS 336,397  4/1959  Switzerland.

NICHOLAS S. RIZZO, *Primary Examiner.*

DUVAL T. McCUTCHEON, *Examiner.*